March 4, 1941.    H. R. CAMPBELL    2,233,936
DENTAL APPLIANCE
Filed March 28, 1940
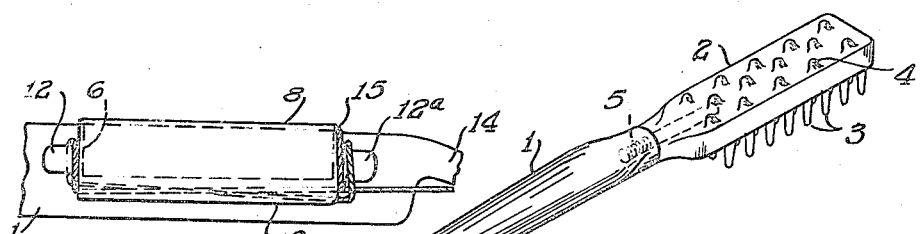
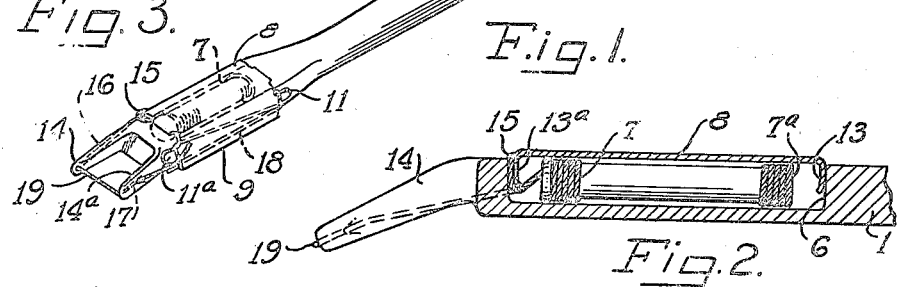
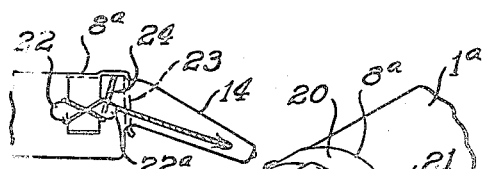
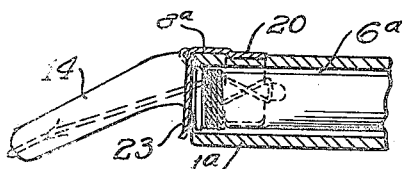
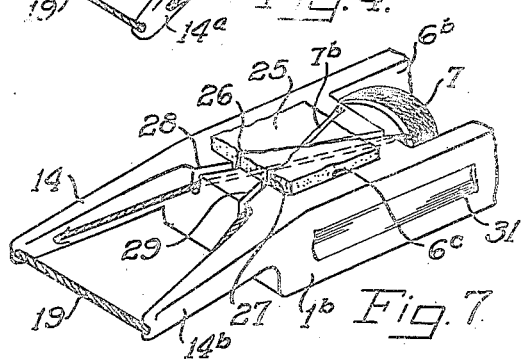
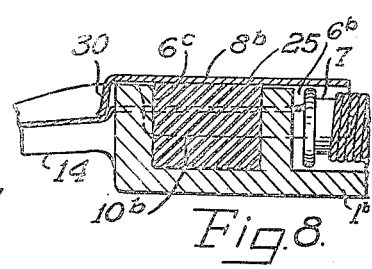
INVENTOR,
H. R. CAMPBELL
BY
Robb & Robb
ATTORNEYS.

Patented Mar. 4, 1941

2,233,936

UNITED STATES PATENT OFFICE 2,233,936

DENTAL APPLIANCE

Howard R. Campbell, Dayton, Ohio

Application March 28, 1940, Serial No. 326,514

11 Claims. (Cl. 132—92)

This invention relates to a dental appliance device for holding under tension and manipulating dental floss for use in the process of cleaning the teeth.

An important object of the invention is the provision of a new dental appliance article of manufacture which may be conveniently employed for manipulating dental floss held under tension to enable the removal of food particles from between the teeth which are not easily removed by ordinary use of a tooth brush or the like.

A particular object of the invention is the provision in a device of the type above described of readily removable means for retaining a spool or other supply of dental floss in a convenient compartment in such device, together with means for holding a length of such dental floss in a convenient manner and under tension to enable ready manipulation of such length of dental floss in the mouth of the user for the purpose mentioned.

Another object of the invention is the provision of a dental appliance of the type described comprising a handle member having a compartment adapted to contain a spool of dental floss, means associated with said member for engaging a length of said dental floss at separated points thereof to position for use a working portion of said floss intermediate said points, and resilient clamping means for retaining the spool in said compartment, said clamping means cooperating with said floss on both sides of the working portion to make said portion taut.

Another object of the invention is the provision of a dental appliance of the type described, comprising means for engaging a length of dental floss at separated points thereof to position for use a working portion of said floss intermediate such points, and means comprising a body of resilient material for anchoring the floss at points on both sides of the working portion to make said portion taut.

The article of the invention may partake of several embodiments, certain of which are shown in the accompanying drawing and described in the annexed specification.

In general, the same may be described as comprising a handle to one end of which is secured in any convenient manner a brushing or massaging member which may be formed integral with the handle, if desired, and which handle is at its opposite end bifurcated, or otherwise formed with suitable protruding prongs or the like, between which is stretched a length of dental floss supplied from a compartment provided adjacent the last-mentioned end of said handle.

A convenient retaining means such as a spring metal clip, or the like, is detachably secured to the handle adjacent the compartment aforesaid for holding a spool or other supply of dental floss in said compartment, and is provided with anchoring means for securely anchoring the dental floss at at least two different points, essentially both before and after it passes through the prong portions aforesaid to insure that a working length of such dental floss is maintained under tension for use.

The retaining means may also assume other forms and the anchoring means provided may be separate from the retaining means as exemplified by one embodiment of the invention shown in the drawing and described in the annexed detailed specification.

In the accompanying drawing, Figure 1 is a perspective view of one embodiment of the invention showing the complete article of manufacture.

Figure 2 is a vertical sectional view of the dental floss holding portion of the embodiment of the invention illustrated in Figure 1.

Figure 3 is a partial side view of the dental floss holding portion of the embodiment of the invention shown in Figure 1, the view being taken from the side opposite that shown in Figure 1.

Figure 4 is a partial perspective view of another embodiment of the invention showing a modified form of the retaining means.

Figure 5 is a partial vertical sectional view of the modified form of the invention shown in Figure 4.

Figure 6 is a partial side view of the modified form of the invention shown in Figure 4, the view being taken from the side opposite that shown in Figure 4.

Figure 7 is a partial perspective view of another embodiment of the invention showing a modified form of anchoring means for the dental floss.

Figure 8 is a partial vertical sectional view of the embodiment of the invention shown in Figure 7.

Now, referring to the drawing and describing the invention in detail, the dental appliance article of manufacture of my invention comprises the handle 1 to which is secured a brush or massaging portion 2, which in the embodiment illustrated in Figure 1 is formed of rubber from one side of which extend a plurality of relatively yieldable projections 3 and from the opposite side of which extend a plurality of relatively unyieldable projections 4, both the projections 3 and 4 being formed from the same rubber body 2.

The brush or massaging portion 2 may be secured in any convenient manner to the handle 1 and for this purpose, as shown in Figure 1, there is provided a threaded stud 5 embedded in the rubber body 2 for cooperation with a corresponding internally threaded portion of the handle 1. Adjacent the opposite end of the handle 1, the same is formed with a recess or cavity 6 within which is positioned a spool of dental floss 7. The dental floss spool 7 is retained in the cavity 6 by means of a retaining member 8 in the form of a spring metal clip of U-shape in cross section, the oppposing parallel vertical leg portions 9 and 10 of which engage the handle 1 at opposite sides of the cavity 6.

Each of the leg portions 9 and 10 is formed with oppositely extending ears 11 and 11a and 12 and 12a respectively, which serve as anchoring means for the dental floss in a manner to be hereinafter described.

The spring clip 8 is also formed at opposite ends with downwardly extending lugs 13 and 13a which engage opposing ends of the recess 6 to maintain the clip 8 properly positioned lengthwise of the handle 1. The handle 1 at the end opposite that to which the massaging member 2 is secured is bifurcated to provide prongs 14 and 14a.

When the appliance is to be made ready for the performance of its dental floss manipulating function, a length of the dental floss 7 is unwound from the spool 7a and drawn outwardly from the recess 6 between the clip 8 and the handle 1, as indicated at 15. A bight of the dental floss 7 is then looped around the ear 12a and the free portion of the dental floss is thence drawn between the lower portion of the leg or skirt 10 of the clip 8 and the handle 1, looped about the ear 12, and drawn back again between the skirt 10 and handle 1, whereupon the free end of the dental floss is threaded through a hollow passage 16 in the prong 14, thence outwardly through an opening in the end of said prong, then across to be threaded through a passage, as at 17, in the prong 14a.

The free portion 18 of the dental floss is then secured to the opposite side of the clip 8, as by looping it about the ears 11 and 11a and passing it between the skirt portion 9 and the handle 1 in a manner similar to that shown in Figure 1.

The mode of looping the dental floss about the ears 12 and 12a and passing it between the clip and handle, as shown in Figure 3, not only serves to anchor the dental floss before it is threaded through the prongs 14 and 14a, but additionally serves to prevent exposure of any greater length than necessary of the floss later to be used. The manner of anchoring the free portion of the dental floss to the opposite side of the clip 8, as shown in Figure 1, is not so material, except to insure that it has been drawn tightly across the outer ends of the prongs 14 and 14a and securely fastened to the clip in some such manner as that shown in Figure 1.

It is essential, in order to insure effective operation of the device for the purpose described, that the dental floss be drawn tightly between the prongs 14 and 14a and securely anchored on both sides thereof to provide a taut dental floss working portion 19.

Referring now to the modification shown in Figures 4 to 6, the handle portion 1a is provided with a bored chamber 6a opening toward the bifurcated end of the handle. The spool of dental floss is disposed in this bored chamber. The spring metal clip 8a comprises a band portion 20 which is seated in a corresponding annular groove extending circumferentially about the handle 1a. Provision of the groove for seating the band 20 enables the same to be maintained in fixed position longitudinally of the handle and to have its outer surface flush with the outer surface of the handle, as seen best in Figure 5.

The band 20 is provided adjacent one end with oppositely extending ears 21 and 21a and adjacent the other end thereof is provided with oppositely extending ears 22 and 22a, these ears being similar to the ears provided on the clip 8 of the construction of Figures 1 and 3 and for the same purpose. The band 20 is provided with a downwardly extending lug 23 which closes the open end of the bored chamber 6a to retain the spool of dental floss therein.

In this construction, the dental floss as it is unwound from the spool extends from the open end of the chamber 6a, as at 24, and is looped about the ears 22 and 22a of the clip 8a, as seen in Figure 6, to anchor the same before being threaded through the prong 14. Then the dental floss is threaded through a prong 14a, as in the previously described construction, and looped about the ears 21 and 21a of the clip 8a in any convenient manner to anchor the free end of the dental floss thereto, after the dental floss has been drawn taut to provide the taut working portion 19.

Now describing the modification shown in Figures 7 and 8, the handle 1b is shown as being provided with two recesses or cavities 6b and 6c, although, if desired, there could be provided one continuous recess of somewhat greater length than the recess 6 provided in the handle of the construction illustrated in Figures 1 to 3. As shown, the spool of dental floss 7 is disposed in the recess 6b and a block of rubber 25 of somewhat greater height than the recess 6c is disposed in said latter recess so that a portion of the rubber block protrudes above the body of the handle, as shown in Figure 7.

The rubber block 25 is partially cut through to provide the cross slits 26 and 27, through the first of which the dental floss 7 as it is unwound from the spool is drawn outwardly and through a corresponding groove 28 in the body of the handle 1b. Then the dental floss is threaded through the prongs 14 and 14b and drawn taut to provide the taut working portion 19 whereupon the free portion 7b of the dental floss is drawn through the slot 29 in the body of the handle 1b and thence through the slit 27 in the rubber block 25. In this construction a spring clip 8b having a lug 30 engaging the end of the handle between the prongs 14 and 14b is provided for retaining the spool and rubber block in their respective recesses. The clip 8b is of generally U-formation in cross section, and the lower edges of the legs or skirt portions 10b are curved inwardly to grippingly engage in corresponding grooves 31 at opposite sides of the handle 1b to enable the clip 8b to be maintained firmly on the handle and when so disposed to compress the rubber block 25 into its recess and thereby firmly anchor the portions of the dental floss 7 extending through the slits in said rubber block.

It will be seen from the foregoing that the invention provides a convenient dental appliance article of manufacture which may function both as a tooth brush or a gum massager and a dental floss manipulating device, and which article may be embodied in many different forms, examples of which are herein shown and described. However, I do not intend to be limited to the details of structure illustrated except as the invention is defined by the appended claims.

Having thus described my invention, what I claim as new and desire to secure by Letters Patent of the United States is:

1. In a device of the class described, in combination, a handle member having a compartment therein opening outwardly, a spool of dental floss contained in said compartment, means associated with said member for engaging a length of said dental floss at separated points thereof to position for use a working portion of said floss intermediate said points, and resilient clamping means adapted to grippingly engage the handle member and having a portion extending across the opening to retain the spool in said compartment, said resilient clamping means cooperating with said floss at points on both sides of the working portion, whereby to make taut the said working portion for the purpose described.

2. In a device of the class described, in combination, a handle member having a compartment therein opening outwardly, a spool of dental floss contained in said compartment, means associated with said member for engaging a length of said dental floss at separated points thereof to position for use a working portion of said floss intermediate said points, and resilient clamping means adapted to grippingly engage the handle member and having a portion extending across the opening to retain the spool in said compartment, said resilient clamping means including fastening means for securing the floss thereto at points on either side of the working portion whereby to make taut the said working portion for the purpose described.

3. In a device of the class described, in combination, a handle member having a compartment therein, said compartment opening outwardly, a spool of dental floss positioned in said compartment, means associated with said member for engaging a length of said dental floss at separated points thereof to position for use a working portion of said floss intermediate said points, and resilient clamping means including portions adapted to grippingly engage opposing sides of said member, and having a portion extending across the opening to retain the spool in said compartment, and said resilient clamping means including fastening ears on each of said portions for securing the floss thereto at points on both sides of the working portion.

4. In a device of the class described, in combination, a handle member having a compartment therein opening outwardly, a spool of dental floss contained in said compartment, means associated with said member for engaging a length of said dental floss at separated points thereof to position for use a working portion of said floss intermediate said points, and resilient clamping means adapted to grippingly engage the handle member and having a portion extending across the opening to retain the spool in said compartment, said resilient clamping means cooperating with said floss at points on both sides of the working portion, whereby to make taut the said working portion for the purpose described, said member being provided with a groove in which the said resilient clamping means is adapted to be seated for positioning the same relative to said member.

5. In a device of the class described, in combination, a handle member having an axial bore opening outwardly, a spool of dental floss contained in said bore, means associated with said member for engaging a length of said floss at separated points thereof to position for use a working portion of said floss intermediate said points, and resilient clamping means adapted to grippingly engage the handle member and cooperating with said floss on both sides of the working portion, whereby to make taut the said working portion for the purpose described, said bore having an opening in the direction of said first means and said resilient clamping means including a part extending across the opening to retain the spool in said bore.

6. In a device of the class described, in combination, a handle member having an axial bore opening outwardly, a spool of dental floss contained in said bore, means associated with said member for engaging a length of said floss at separated points thereof to position for use a working portion of said floss intermediate said points, and resilient clamping means adapted to grippingly engage the handle member and including fastening means for securing the floss thereto at points on either side of the working portion, whereby to make taut the said working portion for the purpose described, said bore having an opening in the direction of said first means and said resilient clamping means including a part extending across said opening to retain the spool in said bore, said member being provided with a groove in which the resilient clamping means is seated for positioning the same relative to said member.

7. In a device of the class described, in combination, a member having a compartment for containing a supply of dental floss, means for engaging a length of dental floss at separated points thereof to position for use a working portion of said floss intermediate such points, and means for retaining said supply in said compartment, said last means including means for anchoring such length of floss at points on both sides of the working portion so positioned, said last means comprising a spring clip having fastening ears at either side thereof.

8. In a device of the class described, in combination, means for engaging a length of dental floss at separated points thereof to position for use a working portion of said floss intermediate such points, and means for anchoring such length of floss at points on both sides of the working portion so positioned, whereby to make taut the said working portion for the purpose described, said last means comprising a rubber block through which portions of the dental floss pass.

9. In a device of the class described, in combination, means for engaging a length of dental floss at separated points thereof to position for use a working portion of said floss intermediate such points, and means for anchoring such length of floss at points on both sides of the working portion so positioned, whereby to make taut the said working position for the purpose described, said last means including a body of resilient material provided with flexible walls receiving therebetween portions of the dental floss at either side of said working portion, and means for acting upon said body to cause said last mentioned portions to be grippingly engaged between said walls.

10. In a device of the class described, in combination, means for engaging a length of dental floss at separated points thereof to position for use a working portion of said floss intermediate such points, and means for anchoring such length of floss at points on both sides of the working portion so positioned, whereby to make taut the said working portion for the purpose described, said last means including a body of resilient material having passages therein receiving portions of the dental floss at either side of said working portion and means acting upon said body to compress the same and thereby grippingly engage the portions of said dental floss in said passages.

11. In a device of the class described, in combination, a handle member having a compartment therein opening outwardly, a supply of dental floss contained in said compartment, a body of resilient material associated with said handle, means for engaging a length of said dental floss at separated points thereof to position for use a working portion of said floss intermediate said points, said body having passages therein and the free end of said dental floss leading from said supply through one of said passages to said means and thence into another of said passages, and means detachably cooperable with said handle for retaining the dental floss supply in said compartment, said last means being operable to compress the said body and thereby grippingly engage the portions of said dental floss in said passages.

HOWARD R. CAMPBELL.